April 7, 1942.	H. M. ULLSTRAND	2,279,017
REFRIGERATION
Filed April 7, 1938
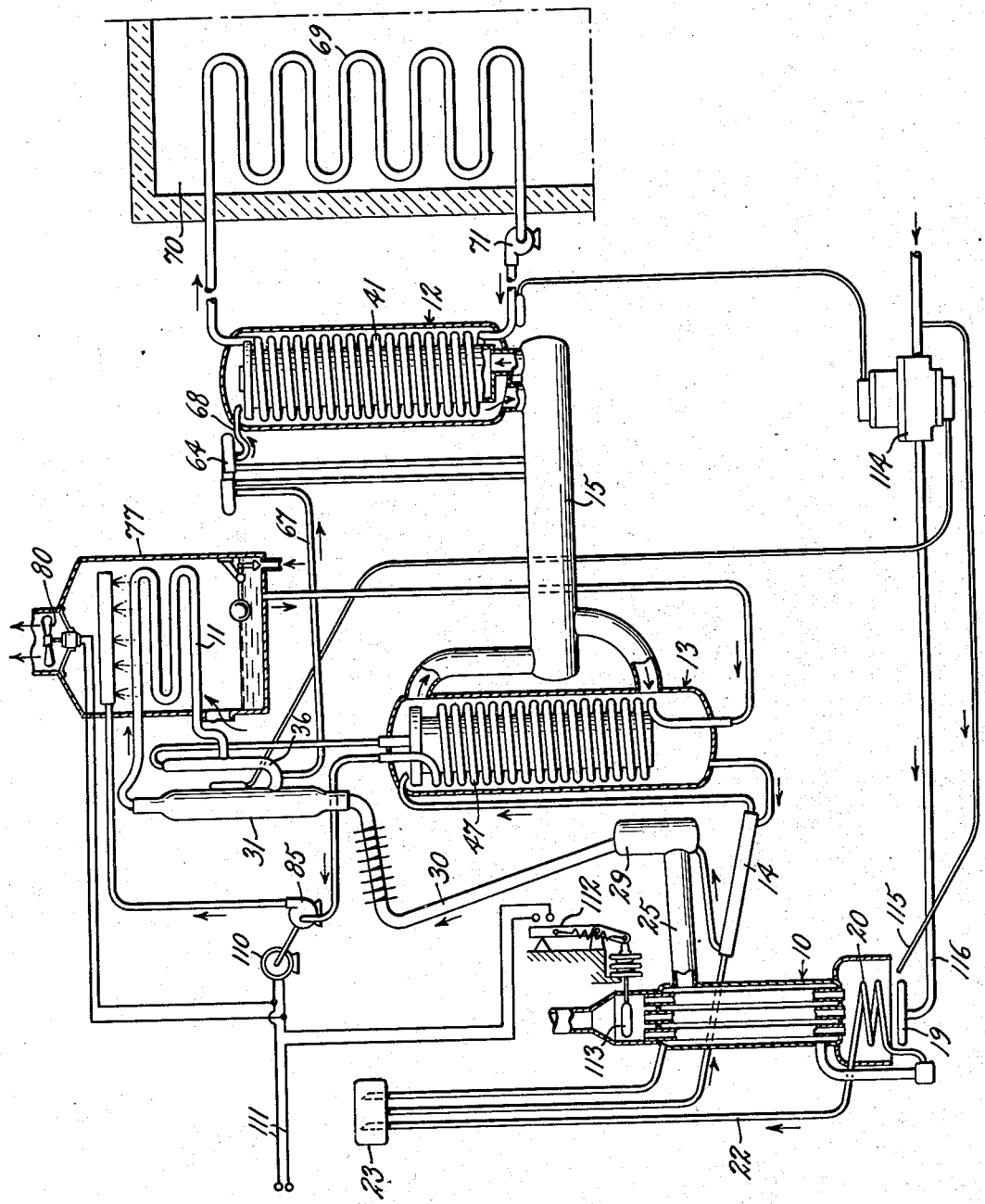
INVENTOR
Hugo M. Ullstrand
BY
D. E. Heath
his ATTORNEY Patented Apr. 7, 1942

2,279,017

UNITED STATES PATENT OFFICE 2,279,017

REFRIGERATION

Hugo M. Ullstrand, Evansville, Ind., assignor to Servel, Inc., New York, N. Y., a corporation of Delaware Application April 7, 1938, Serial No. 200,574

5 Claims. (Cl. 62—5)

My invention relates to refrigeration and it is an object of the invention to provide a heat operated refrigeration system having control of cooling medium responsive to input.

The drawing shows more or less diagrammatically a uniform pressure absorption refrigeration system embodying the invention.

The refrigeration system illustrated is generally like that described in application Serial No. 107,852 of Albert R. Thomas, now Patent No. 2,207,838 granted July 16, 1940. The description of the apparatus in said application is hereby incorporated in this specification. The system contains ammonia, water, and hydrogen. Other suitable fluids may be used.

In operation, ammonia vapor is expelled from solution in a generator 10 due to heating by a heater or burner 19. The vapor flows through an analyzer 25, vessel 29, conduit 30, and rectifier 31 into the upper end of a condenser 11 in the evaporative water cooler 77. Ammonia vapor is condensed to liquid in condenser 11 and the liquid ammonia flows into a rectifier trap 36. Liquid ammonia flows from trap 36 through a conduit 67, precooler 64, and conduit 68 into the upper part of an evaporator 12.

Liquid ammonia flows downward over coil 41 in evaporator 12 and evaporates and diffuses into hydrogen, producing a refrigeration effect on heat transfer fluid in coil 41. A pump 71 causes circulation of the heat transfer fluid through and between the coil 41 and a coil 69 in a refrigerator compartment 70 for cooling this compartment.

Gas circulates through and between the evaporator 12 and an absorber 13 by way of a gas heat exchanger 15. This circulation is caused by difference in specific weights of gas in different parts of this circuit. In the absorber 13 ammonia vapor is absorbed out of the hydrogen into weakened absorption solution which flows downward over coil 47. Absorption liquid circulates through and between the absorber 13 and generator 10 by way of a liquid heat exchanger 14. This liquid circulation is caused by a vapor liquid lift conduit 22 of which a lower coiled portion 20 is heated by the generator burner 19. The vapor liquid lift causes upward flow of liquid from the lower part of generator 10 into an elevated circulation vessel 23 from which the liquid overflows into the absorber 13 through a conduit having a part forming an inner passage of the liquid heat exchanger 14.

The absorber 13 is cooled by flow of water from the evaporative cooler 77 through the absorber coil 47. Circulation of water through and between the evaporative cooler 77 and absorber 13 is caused by a pump 85 which is driven by an electric motor 110. A fan 80 for the evaporative cooler or spray tower 77 is also operated by an electric motor which is connected to conductors 111 in parallel with the pump motor 110. One motor may be used to drive both the pump and fan. The fan and pump motors are connected by the conductors or line 111 to a suitable source of electrical supply, not shown.

In the line 111 is connected a thermostatic switch 112 of which the sensitive element 113 is located in the upper end of the flue of the generator 10. Upon increase in temperature, as when the generator heater 19 is in operation, the thermostatic switch 112 closes the circuit of the fan and pump motors, thereby causing cooling of the absorber 13 and condenser 11. When heat input to the generator 10 is decreased or interrupted, the thermostatic switch 112 opens the motor circuit and interrupts cooling of the absorber and condenser.

This automatic control is particularly useful when the coil 69 in the refrigerator compartment 70 is being operated at a temperature below freezing and it is desired to defrost this coil at intervals. By interrupting cooling of the absorber 13, the refrigeration temperature and therefore the temperature of coil 69 increases more rapidly and the defrosting temperature is more quickly reached.

The heater or gas burner 19 is turned on and off by a thermostatic valve 114 responsive to temperature of heat transfer fluid flowing from the refrigerator coil 69 to the evaporator 12. A pilot 115 maintains a small flame for lighting the burner 19 when gas is turned on by the thermostatic valve 114. The latter is adjusted so that the gas is turned off at a predetermined low temperature of fluid from coil 69 and turned on when this temperature increases a predetermined amount, for instance, to a value of 37° F.

What is claimed is:

1. An absorption type refrigeration system including a generator, a heater for said generator, a control for stopping and starting said heater, an absorber, a condenser, a liquid circuit for cooling said absorber and condenser and including an evaporator, a liquid circulator for circulating liquid in said circuit, and a second control for stopping and starting said liquid circulator responsive to the stopping and starting, respectively, of said heater.

2. A heat operated continuous refrigeration system having a heater for supplying heat to the system, a cooler for taking heat rejected by the system, a control for stopping and starting said heater, and a second control to start and stop said cooler responsive to the starting and stopping of said heater including a thermostat subjected to heat derived from said heater.

3. An absorption refrigeration system having a generator, a heater for said generator, a control for stopping and starting said heater, an absorber, a cooler for said absorber, and a second control for stopping and starting said cooler responsive to the starting and stopping of said heater including a temperature responsive element subjected to heat derived from said heater.

4. An absorption refrigeration system having a generator provided with a flue, a fluid fuel burner arranged so that the flame produced thereby is projected into said flue, an absorber, a cooler for cooling said absorber, and means including a thermostat for starting said cooler responsive to the heating effect produced in said flue by the burner flame.

5. A heat operated continuous refrigeration system having a plurality of parts including a heat receiving part and a heater for supplying heat to such heat receiving part, a cooler for taking heat rejected by another part of the system when heat is being supplied to said heat receiving part and comprising a circuit for liquid including an evaporator, a control for said heater, and a second control to regulate flow of liquid in said circuit including a thermostat subjected to heat derived from said heater.

HUGO M. ULLSTRAND.